(12) United States Patent
Lee

(10) Patent No.: US 9,116,017 B2
(45) Date of Patent: Aug. 25, 2015

(54) MAGNETIC INDUCTIVE TYPE POSITION SENSOR

(75) Inventor: Changhwan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 171 days.

(21) Appl. No.: 13/556,909

(22) Filed: Jul. 24, 2012

(65) Prior Publication Data

US 2013/0141083 A1 Jun. 6, 2013

(30) Foreign Application Priority Data

Dec. 1, 2011 (KR) .................. 10-2011-0127511

(51) Int. Cl.
| | |
|---|---|
| *G01B 7/14* | (2006.01) |
| *G01D 5/14* | (2006.01) |
| *G01D 5/20* | (2006.01) |
| *G01B 7/00* | (2006.01) |

(52) U.S. Cl.
CPC .............. *G01D 5/145* (2013.01); *G01B 7/003* (2013.01); *G01D 5/2033* (2013.01)

(58) Field of Classification Search
CPC ............................ G01D 5/2033; G01B 7/003
USPC ........................................ 324/207.15, 207.25
See application file for complete search history.

(56) References Cited

U.S. PATENT DOCUMENTS

| | | |
|---|---|---|
| 6,525,938 B1 | 2/2003 | Chen |
| 7,105,975 B2 * | 9/2006 | Semones et al. ....... 310/216.008 |
| 7,391,205 B2 | 6/2008 | Gandel et al. |

FOREIGN PATENT DOCUMENTS

| | | |
|---|---|---|
| EP | 1081454 A1 | 3/2001 |
| EP | 2065682 A1 | 6/2009 |
| JP | 02-119544 A | 5/1990 |
| JP | 05-175037 A | 7/1993 |
| JP | 06-098514 A | 4/1994 |
| JP | 2002-107110 A | 4/2002 |
| KR | 10-0789514 B1 | 12/2007 |

OTHER PUBLICATIONS

European Search Report dated Mar. 20, 2013 in European Application No. 12176657.0.

* cited by examiner

*Primary Examiner* — Reena Aurora
(74) *Attorney, Agent, or Firm* — Saliwanchik, Lloyd & Eisenschenk

(57) ABSTRACT

Disclosed is a magnetic inductive type position sensor, the position sensor including at least one rotor body coupled to a rotation shaft to rotate in association with rotation of the rotation shaft and having a plurality of protrusively and circumferentially formed wing members, a PCB arranged in opposition to the rotor body, and a guide member connecting each distal end of the wing members to guide each of the wing members to be aligned on the same planar surface.

11 Claims, 3 Drawing Sheets

MAGNETIC INDUCTIVE TYPE POSITION SENSOR

CROSS-REFERENCE TO RELATED APPLICATION

This application claims the benefit under 35 U.S.C. §119 of Korean Patent Application No. 10-2011-0127511, filed Dec. 1, 2011, which is incorporated by reference herein in its entirety.

BACKGROUND

1. Field of the Invention

The present disclosure relates to a position sensor using a magnetic induction.

2. Discussion of the Related Art

This section provides background information related to the present disclosure which is not necessarily prior art.

Various forms of sensors have been used to measure a position of a rotation shaft in response to interactive movement between a rotor and a stator. Among the various methods, an example of a position sensor using a magnetic induction is disclosed by European Registered Patent No.: EP 1081454 and a U.S. Pat. No. 6,384,598.

In the above mentioned prior art, a rotor is disposed with a disk, and the disk is formed with a plurality of fan-like geometries. A PCB (Printed Circuit Board) aligned opposite to the plurality of fan-like geometries is formed with a circuit pattern conductive with a current at a position corresponding to the plurality of geometries, and a position of the rotor is detected by using a changing value of magnetic field generated during current conduction on the circuit pattern through interaction with the plurality of geometries.

However, the conventional methods are disadvantageous in that, in a case flatness of geometries protrusively and radially formed on the disk is not uniform, a gap between the PCB and the geometries may not be constantly maintained to generate an uneven magnetic induction characteristic. This mechanical problem disadvantageously results in a ripple phenomenon in an output characteristic of a detection sensor to increase an overall fabrication cost of the sensor and an error of the output signal.

It is, therefore, desirable to overcome the above problems and others by providing an improved magnetic inductive type position sensor.

BRIEF SUMMARY

This section provides a general summary of the disclosure, and is not a comprehensive disclosure of its full scope or all of its features.

The present disclosure is directed to cope with the above-mentioned problems/disadvantages and it is an object of the present disclosure to provide a magnetic inductive type position sensor improved in structure so that flatness of fan-like geometries provided on a rotor can be uniformly maintained.

Technical problems to be solved by the present disclosure are not restricted to the abovementioned description, and any other technical problems not mentioned so far will be clearly appreciated from the following description by the skilled in the art.

In a general aspect of the present disclosure, there is provided a magnetic inductive type position sensor, the position sensor comprising: at least one rotor body coupled to a rotation shaft to rotate in association with rotation of the rotation shaft and having a plurality of protrusively and circumferentially formed wing members; a PCB arranged in opposition to the rotor body; and a guide member connecting each distal end of the wing members to guide each of the wing members to be aligned on the same planar surface.

Preferably, but not necessarily, the PCB includes a current-flowing circuit pattern at a position corresponding to that of the wing member.

Preferably, but not necessarily, the rotor body includes a first rotor arranged at a front surface of the PCB, and a second rotor arranged at a rear surface of the PCB.

Preferably, but not necessarily, each of the first and second rotors has a different number of wings and a different size of wing areas.

Preferably, but not necessarily, the guide member is a ring-shaped member coupled to each distal end of the plurality of wing members.

Preferably, but not necessarily, the guide member is integrally formed with the wing member.

Preferably, but not necessarily, the guide member includes a first guide member arranged on the first rotor and a second guide member arranged on the second rotor.

Preferably, but not necessarily, the first and second guide members are ring-shaped members coupled to the first and second rotors.

Preferably, but not necessarily, the first and second guide members are integrally formed with the wing members arranged on the first and second rotors.

Preferably, but not necessarily, the first guide member is formed with a part mutually different from that of the wing member of the first rotor, and the second guide member is integrally formed with the wing member of the second rotor.

Preferably, but not necessarily, the first guide member is integrally formed with the wing member of the first rotor, and the second guide member is formed with a part mutually different from that of the wing member of the second rotor.

The magnetic inductive type position sensor thus configured according to the present disclosure has an advantageous effect in that distal ends of wing members are mutually connected in the course of manufacturing the wing members of a rotor to minimize deformation of each wing member, whereby flatness of wing members can be constantly configured to thereby maintain a uniform sensor measurement value.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present disclosure will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
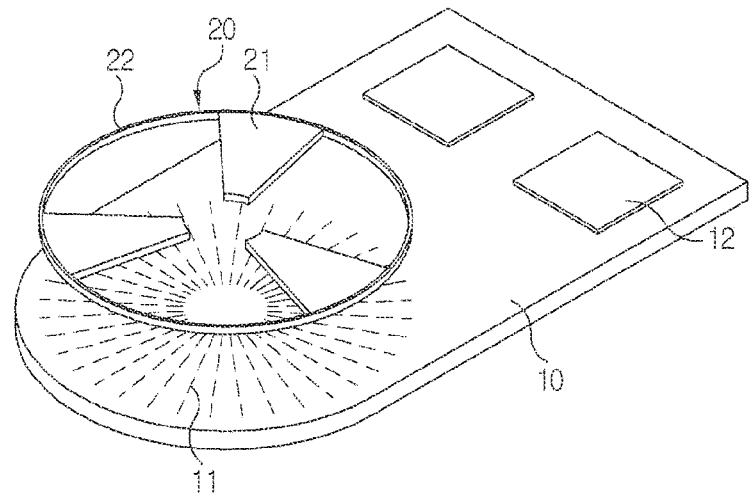
FIG. 1 is a schematic view illustrating an operation principle of a magnetic inductive type position sensor according to the present disclosure.

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, a magnetic inductive type position sensor according to the exemplary embodiments of the present disclosure will be described in detail with reference to the accompanying drawings.

Figure 2:
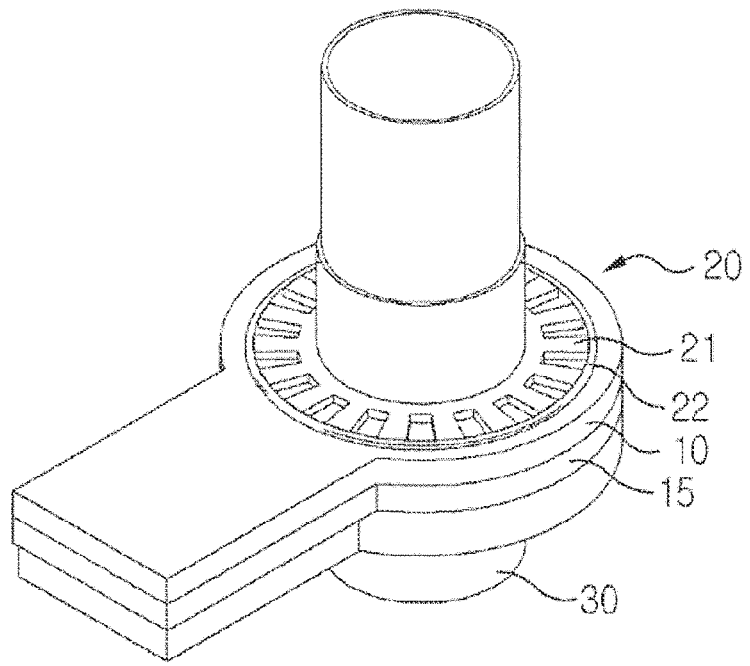
FIG. 2 is a schematic perspective view illustrating a magnetic inductive type position sensor according to an exemplary embodiment of the present disclosure.
Figure 3:
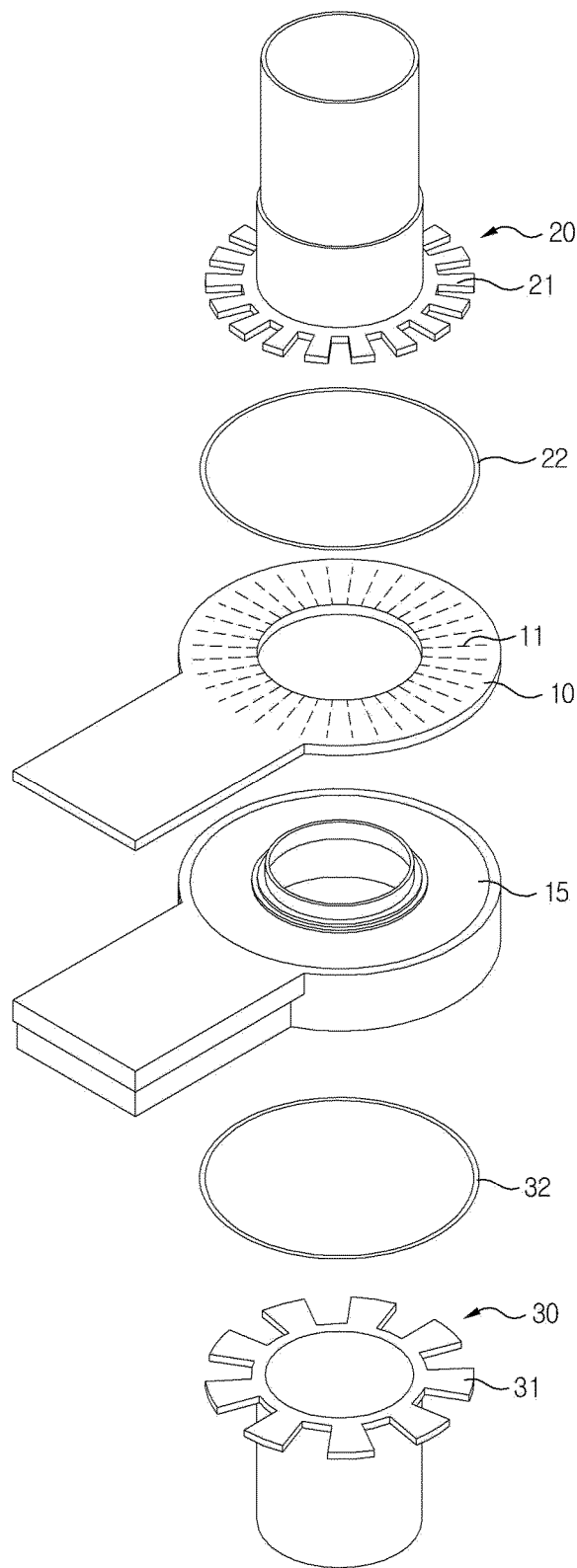
FIG. 3 is an exploded perspective view of FIG. 2.
Figure 4:
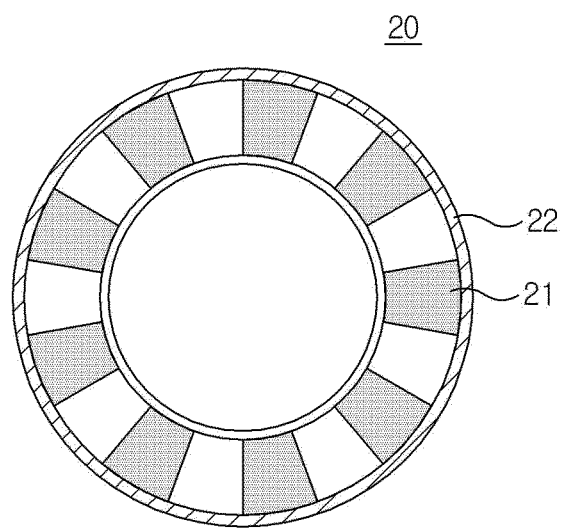
FIG. 4 is a schematic plan view illustrating a first rotor of FIG. 2.

FIG. 1 is a schematic view illustrating an operation principle of a magnetic inductive type position sensor according to the present disclosure, FIG. 2 is a schematic perspective view illustrating a magnetic inductive type position sensor according to an exemplary embodiment of the present disclosure, FIG. 3 is an exploded perspective view of FIG. 2, and FIG. 4 is a schematic plan view illustrating a first rotor of FIG. 2.

Referring to FIG. 1, a magnetic inductive type position sensor according to the present disclosure includes a PCB (Printed Circuit Board, 10) and a rotor (20). The PCB may be radially formed with a current-flowing circuit pattern, and mounted with a predetermined controller (12). Generally, the controller (12) may be formed in ASCI (Application-Specific Integrated Circuit). The controller (12) may be also formed in a pair of identical types of ASCIs. The current may be a 3-phase current.

The rotor (20) may be connected to a rotation shaft (not shown), where each distal end of a plurality of wing members may be connected to a ring-shaped guide member (22). According to an exemplary embodiment of the present disclosure, the rotor (20) may be configured in such a manner that a disk-shaped body is penetratively formed with identically-shaped wing members using a press work, where a distal end is shaped of a ring and the body is integrally formed with the wing member (21) with a same material.

In another exemplary embodiment, the wing member (21) is such that the wing member (21) is formed with a space by using a press work, a distal end of the wing member is fixed by a guide member (22) provided in any one material of a ring-shaped rubber, silicon and synthetic resin material, and the plurality of wing members (21) is so guided as to allow each wing member (21) to be discrete at a predetermined gap relative to the PCB (10).

According to the configuration thus mentioned, the plurality of wing members (21) rotating in association with rotation of the rotation shaft may be always distanced from a circuit pattern (11) formed on the PCB (10) at a predetermined space, whereby no ripples of other detection signals caused by rotation of the rotor are generated.

FIGS. 2 and 3 illustrate a state where a torque sensor is formed using a principle of the magnetic inductive type position sensor thus configured.

Referring to FIGS. 2 and 3, the PCB (10) is provided therein with a circuit pattern, and first and second rotors (20, 30) may be arranged at upper and bottom sides opposite to the circuit pattern (11). Meanwhile, the PCB (10) is coupled thereunder to a cover member (15) supporting the PCB (10). The cover member (15) is preferably provided with a material capable of penetrating a magnetic force formed at the circuit pattern (11), and is preferably provided with a resin material.

The first rotor (20) is provided with a first number (n1) of first wing members (21) and a distal end of the first wing member (21) is coupled by a ring-shaped first guide member (22) provided in a separate material. The second rotor (30) is provided with a second number (n2) of second wing members (31) and a distal end of the second wing member (31) is coupled by a ring-shaped second guide member (32) provided in a separate material.

Meanwhile, the number of first wing member (21) and the number of second wing members (31) are preferably different, where the number of first wing member (21) may be greater than that of the second wing member (31), or alternatively the number of second wing member (31) may be greater than that of the first wing member (21).

The reason of differentiating the numbers of first and second wing members (21, 31) is to calculate an angle and a torque using an average value of torsion angles measured from the first and second rotors (20, 30) by measuring a torsion angle of an input shaft (not shown) connected to the first rotor (20) and a torsion angle of an output shaft (not shown) connected to the second rotor (30).

That is, in a case the number of first wing member (21) and the number of second wing members (31) are different, mutually different peak signals can be detected by magnetic changes detected by interaction with the circuit pattern (11) due to different areas of first and second wing members (21, 31), whereby torsion angles of input shaft and output shaft can be individually calculated.

Meanwhile, although not illustrated, the first and second guide members (22, 320 may be configured in one body with the first and second rotors (20, 30). That is, in a case the disk-shaped first and second rotors (20, 30) are formed with the first and second wing members (21, 31) using the press work, only the mutually discrete spaces of the first and second wing members (21, 31) may be formed by punching so that each distal end of the first and second wing members (21, 31) can be connected in a ring-shape.

In this case, simplification may be accomplished by omitting a separate assembly process of first and second guide members (22, 32), and the first and second wing members (21, 31) are prevented from being bent in the course of forming the first and second wing members (21, 31).

In a case the first guide members (22, 32) are provided and assembled with separate members, and in a case the first and second guide members (22, 32) are integrally formed with the first and second wing members (21, 31), each distal end of the first and second wing members (21, 31) is guided by ring-shaped first and second guide members (22, 32), whereby each of the first and second wing members (21, 31) is prevented from being formed with a different height in the course of processing work.

Furthermore, in a case the first and second guide members (22, 32) are formed with different members, a position correction of positioning the first and second wing members (21, 31) each at an accurate position can be made through coupling of the first and second guide members (22, 32), even if each of the first and second wing members (21, 31) is formed with a slightly different height in the course of processing work.

As apparent from the foregoing, the magnetic inductive type position sensor thus configured according to the present disclosure has an industrial applicability in that a distance between the first and second wing members (21, 31) and circuit pattern (11) of PCB (10) can be constantly maintained to minimize the ripple phenomenon of detection signals caused by magnetic field changes, and to enhance reliability of the sensor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A magnetic inductive type position sensor, the position sensor comprising:
    a first rotor and a second rotor adapted to be coupled to a rotation shaft to rotate in association with a rotation of the rotation shaft and each rotor having a plurality of protrusively and circumferentially formed wing members that rotate with each rotor;
    a printed circuit board (PCB) arranged between the first and second rotors;
    a cover member disposed beneath the PCB, supporting the PCB; and
    a first guide member configured to connect each distal end of the wing members of the first rotor, such that lower surfaces of the wing members of the first rotor are aligned to be on a same first planar surface; and
    a second guide member configured to connect each distal end of the wing members of the second rotor, such that upper surfaces of the wing members of the second rotor are aligned to be on a same second planar surface;
    wherein the first rotor and the second rotor have different numbers of wing members.

2. The position sensor of claim 1, wherein the PCB includes a current-flowing circuit pattern at a position corresponding to that of the wing members.

3. The position sensor of claim 1, wherein the first rotor is arranged at a front surface of the PCB, and the second rotor is arranged at a rear surface of the PCB.

4. The position sensor of claim 3, wherein wing members of the first and second rotors have different areas.

5. The position sensor of claim 4, wherein the first guide member is arranged on the first rotor and the second guide member is arranged on the second rotor.

6. The position sensor of claim 5, wherein the first and second guide members are ring-shaped parts coupled to the first and second rotors, respectively.

7. The position sensor of claim 5, wherein the first and second guide members are integrally formed with the wing members arranged on the first and second rotors, respectively.

8. The position sensor of claim 5, wherein the first guide member is formed with a component mutually different from that of the wing members of the first rotor, and the second guide member is integrally formed with the wing members of the second rotor.

9. The position sensor of claim 5, wherein the first guide member is integrally formed with the wing members of the first rotor, and the second guide member is formed with a component mutually different from that of the wing members of the second rotor.

10. The position sensor of claim 1, wherein each of the first and second guide members is a ring-shaped member coupled to each distal end of the plurality of wing members.

11. The position sensor of claim 1, wherein each of the first and second guide members is integrally formed with the wing members.

* * * * *